Aug. 4, 1931.  H. E. LIPPERT  1,817,416
CONTROL SYSTEM FOR MOTOR VEHICLES
Filed March 15, 1929
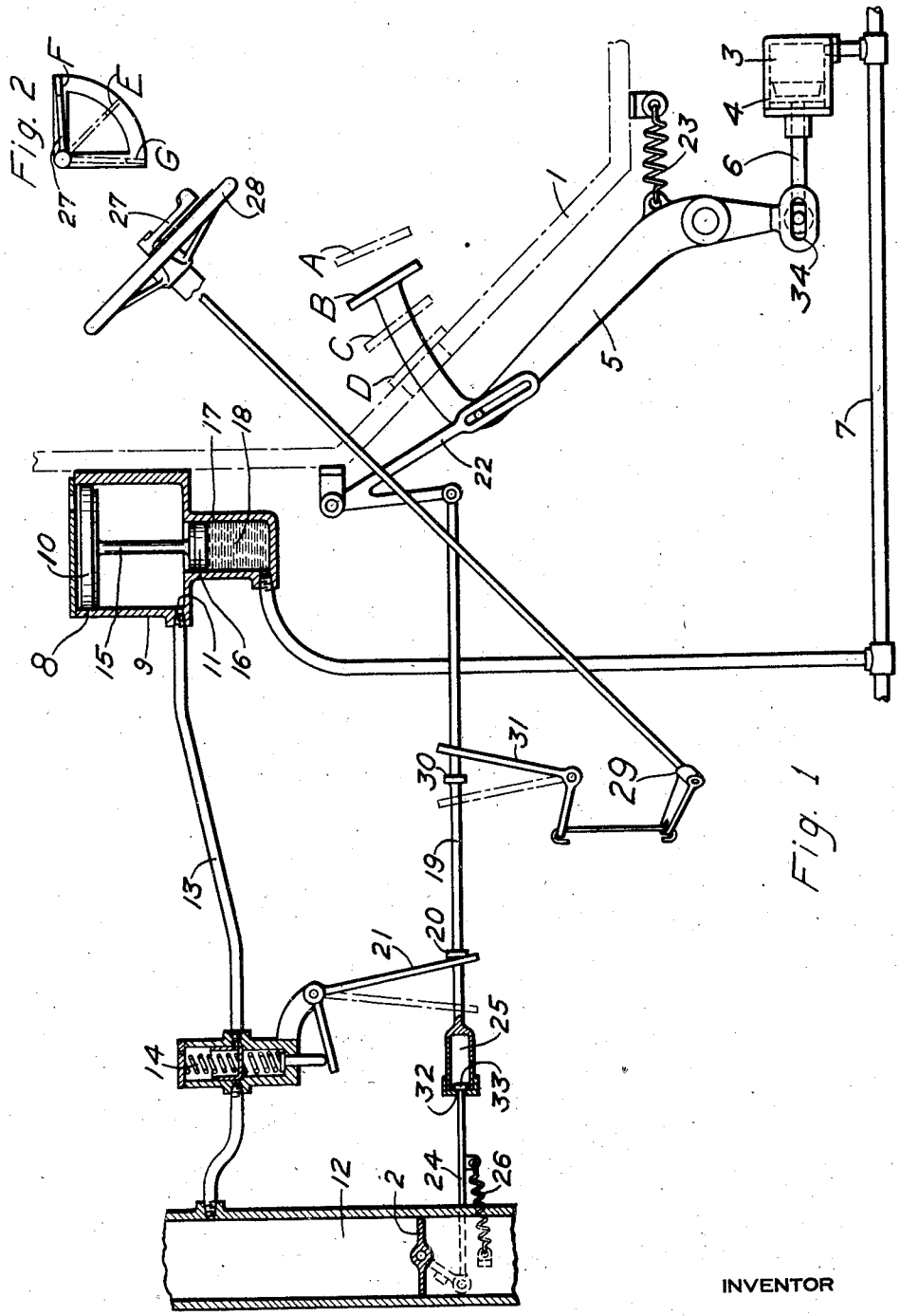
INVENTOR
Henry E. Lippert Patented Aug. 4, 1931

1,817,416

UNITED STATES PATENT OFFICE

HENRY E. LIPPERT, OF PITTSBURGH, PENNSYLVANIA

CONTROL SYSTEM FOR MOTOR VEHICLE

Application filed March 15, 1929. Serial No. 347,313.

This invention relates to a common control for accelerating and retarding a motor vehicle, and pertains particularly but is not limited to a common control for accelerating and retarding a motor vehicle equipped with hydraulic brakes.

An object of the invention is the provision of a system in a motor vehicle to simplify the controlling of the vehicle.

Another object of the invention is the provision of means in a common accelerator and power brake pedal system for manually applying the brakes with the same common pedal.

Other objects and advantages will be apparent during the course of the following description.

Similar reference characters in the different figures of the drawings indicate corresponding elements or features of construction herein referred to.

Fig. 1 is a fragmentary elevational view of a motor vehicle equipped with an embodiment of the invention and is more or less diagrammatic.

Fig. 2 illustrates the common hand accelerator and brake control on the steering wheel.

In Figure 1, the numeral 1 designates the toe-board of a motor vehicle; 2, the throttle valve; and 3, the master cylinder of a hydraulic brake system. The plunger 4, in the master cylinder 3, is moved by depressing the common control pedal 5, causing rearward movement of the rod 6 which is connected to the plunger. A pressure is then created in the pipe lines 7 leading from the master cylinder 3 to the cylinders associated with the front and rear wheels of the motor vehicle (not shown) which actuates the pistons in these cylinders thus applying the brakes in the well known manner.

Inserted in the pipe lines 7 is the fluid pressure motor 8 for actuating the hydraulic brakes by power. The fluid pressure motor 8 comprises mainly the cylinder 9 and the piston 10. A port 11, in the cylinder 9, is in communication with the manifold 12 by means of the conduit 13. Inserted in the conduit 13 is the valve 14 for controlling communication between the fluid pressure motor 8 and the manifold 12. The piston 10 is actuated by the suction in the manifold 12 when the vehicle engine (not shown) is running. Connected to the piston 10 is the stem 15 and the plunger 16. The plunger 16 is arranged to move in the smaller cylinder 17 of the air-hydraulic brake actuating device, and acts on the column of liquid 18 when the valve 14 is opened. The column of liquid 18 is a part of the liquid in the hydraulic brake system, and when the plunger 16 is moved by the piston 10 a pressure is created in the hydraulic brake system which actuates the brakes in the same manner as the manually moved plunger 4.

The valve 14 is controlled by movement of the rod 19. A shoulder 20, on the rod 19, engages and moves the valve lever 21 which opens the valve 14. Movement of the common control pedal 5 moves the rod 19 by means of the lever 22. A spring 23 tends to keep the common control pedal 5 in the upward position (designated by the letter A in Figure 1 of the drawings) and oppose the pressure of the operator's foot. A second rod 24 opens the throttle valve 2 and is arranged to move in the recessed end 25 of the rod 19 when the rod 19 is moved forward. A light spring 26 tends to keep the throttle valve 2 in its closed position.

Many times it is desirable to control the vehicle by hand and move the feet about to various positions. For this purpose I have provided the common hand control 27. The common hand control 27 is located on the steering wheel 28 and moves the rod 19 by means of the lever and rod construction 29 and the shoulder 30 on the rod 19. Movement of the common hand control 27 from the neutral position (designated by the letter E in Figure 2 of the drawings) to the position designated by the letter F accelerates the vehicle in the same manner as movement of the common control pedal 5 accelerates the vehicle in moving from the position designated by the letter B, in Figure 1, to the position designated by the letter A, which is described hereinafter. Movement of the common hand control 27 from the position designated by the letter E, in Figure 2, to the position designated by the letter G retards the vehicle in the same manner as movement of the common control pedal 5 retards the vehicle in moving from the position designated by the letter B, in Figure 1, to the position designated by the letter C, which is described hereinafter. Movement of the common hand control 27 from the E position to the G position opens the valve 14 and applies the hydraulic brakes by power, but does not effect the throttle valve 2. When the operator's foot is depressing the "starter" it will be desirable to control the throttle valve 2 with the common hand control 27.

As shown in Figure 1, the vehicle is being controlled by the common control pedal 5 which is in its neutral or B position. The common hand control 27 is set at the F position so that the lever 31 will not interfere with the movement of rod 19 by the common control pedal 5. If the hand control 27 was set in its neutral position the lever 31 would engage the shoulder 30 preventing rearward movement of the rod 19, and the foot control 5 could not move above its neutral position to open the throttle valve upon a release of the operator's foot. The foot control 5 would then be only capable of applying the brakes.

Upward movement of the common control pedal 5 from the B or neutral position to the A position accelerates the vehicle. The shoulder 32 on the rod 19 engages the head 33 on the rod 24, thus pulling the rod 24 rearward, the spring 23 being stronger than spring 26, which opens the throttle valve 2. Downward movement of the common control pedal 5 from the A position to the B position permits the light spring 26 to close the throttle valve 2. Movement of the common control pedal 5 between the A position and B position does not effect the valve 14 or the plunger 4. The slot 34 in the common control pedal 5 permits the common control pedal 5 to move from the A position to the C position with no effect on the plunger 4. Downward movement of the common control pedal 5 from the C position to the position designated by the letter D moves the plunger 4 and manually applies the hydraulic brakes, due to the common control pedal 5 engaging the pin on the rod 6. Downward movement of the common control pedal 5 from the B or neutral position to the D position opens the valve 14 and makes communication between the fluid pressure motor 8 and the manifold 12 which applies the hydraulic brakes by power.

Moving the hand control 27 from the E to G position to apply the brakes causes the shoulder 30 on the rod 19 to move from its present position in Fig. 1 to the "dot and dash" position of lever 31. This same movement of the hand control 27 causes the shoulder 20 on the rod 19 to move from its present position to a position intermediate the range of movement of the valve lever 21. The range of movement of the valve lever 21 is from its present position to the "dot and dash" position. Thus, it is apparent that the hand control 27 does not apply the brakes to their maximum braking pressure. But movement of the foot pedal 5 from the B to D position causes the shoulder 20 to move the valve lever 21 its entire range; thus, applying the brakes to their maximum braking pressure.

Upward movement of the common control pedal 5 from the D position to the B position closes the valve 14 and breaks communication between the fluid pressure motor 8 and the manifold 12 which releases the hydraulic brakes. Moving the common control pedal 5 between the B position and D position has no effect on the throttle valve 2 as the head 33 on the rod 24 moves in the recess 25 of the rod 19.

It has been shown that the hydraulic brakes are applied manually by movement of the common control pedal 5 between the C position and D position, and that the hydraulic brakes are applied by power by movement of the common control pedal 5 between the B position and D position. Therefore movement of the common control pedal 5 between the C position and D position applies the hydraulic brakes manually and by power, and between the B and C positions by power only.

I have shown and described what I believe is a preferred construction of my invention, but those skilled in the art may see various improvements, so I do not regard the invention as limited to the construction illustrated and described, except insofar as I have included such limitations within the scope of the following claims.

Having now described my invention, what I claim as new and desire to secure by Letters Patent, is:

1. In a motor vehicle having a throttle valve and a hydraulic brake system, a fluid pressure motor for creating a pressure in said hydraulic brake system, a valve for controlling the fluid pressure, and a common foot pedal for actuating both said valves and for manually creating a pressure in said hydraulic brake system.

2. In a motor vehicle having a throttle valve and brakes; a foot control arranged to apply said brakes by power and manual effort by a depression from a neutral position and to open said throttle valve by a release from said neutral position.

3. In a motor vehicle having brakes; a foot control for actuating said brakes, the movement of said foot control having a range for applying said brakes by power and a range for applying said brakes both by power and manually.

4. In a motor vehicle having a throttle valve and brakes that are applied manually and by power; a foot control arranged to open said throttle valve by upward movement from a neutral position, to apply said brakes by power by a partial downward movement from said neutral position, and to apply said brakes manually by the remaining downward movement.

5. In a motor vehicle having a throttle valve and brakes; power means for actuating the brakes, and a common control for actuating the throttle valve, for applying the brake by power by partial downward movement and for manually applying the brakes by further downward movement.

6. In a motor vehicle; means of acceleration, means of retardation, power means for actuating said means of retardation, and a common control for accelerating the vehicle for retarding the vehicle by power or simultaneously by power and manually.

7. In a motor vehicle having a throttle valve and brakes; a foot control arranged to apply the brakes by power or by power and manual effort by a depression thereof, and to open the throttle valve by a release thereof.

8. In a motor vehicle having brakes; a control for actuating said brakes, the movement of said control having a range for applying said brakes by power and a range for applying said brakes manually.

9. In a motor vehicle having brakes; a control for actuating said brakes so arranged that a partial downward movement applies the brakes by power and a further downward movement applies the brakes manually.

10. In a motor vehicle having a throttle valve and brakes; power means for applying said brakes, a control for said throttle valve and said brakes, the movement of said control having a range for opening said throttle valve, a range for applying said brakes by power and a range for applying said brakes manually.

11. In a motor vehicle; means of acceleration, means of retardation, power means for actuating said means of retardation, a common hand control for accelerating and retarding the vehicle, and a common foot control for accelerating the vehicle and for retarding the vehicle by power and manually.

12. In a motor vehicle having brakes; power means for applying the brakes, a hand control for applying said brakes by power, and a foot control for applying the brakes by power and manually.

13. In a motor vehicle having brakes, power means for applying the brakes, a hand control for applying the brakes by power, and a foot control so arranged that a partial downward movement applies the brakes by power and a further downward movement applies the brakes manually.

14. In a motor vehicle having brakes, power means for applying the brakes, a hand control for applying the brakes by power, a foot control for applying the brakes by power and manual effort, the maximum braking pressure obtained by actuation of the foot control being greater than the maximum braking pressure obtained by actuation of the hand control.

15. In a motor vehicle having a throttle valve and brakes; power means for applying the brakes, a control for the throttle valve and brakes, the movement of said control having a range for opening the throttle valve, and a range for applying the brakes simultaneously by power and with manual effort.

16. In a motor vehicle having a throttle valve and brakes; power means for applying the brakes, a hand control for opening the throttle valve and applying the brakes, and a foot control for applying the brakes simultaneously by power and with manual effort.

In testimony whereof, I affix my signature.
HENRY E. LIPPERT.